Jan. 17, 1928.  1,656,593
J. D. MERRIFIELD
SCREW THREAD CUTTING TOOL FOR CUTTING TAPERED THREADS
Filed Feb. 19, 1923
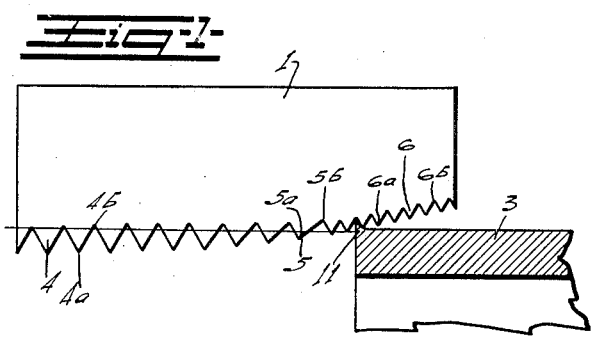
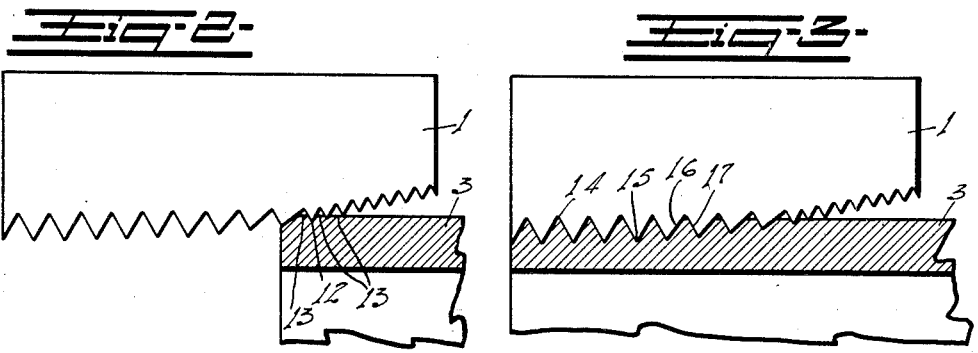
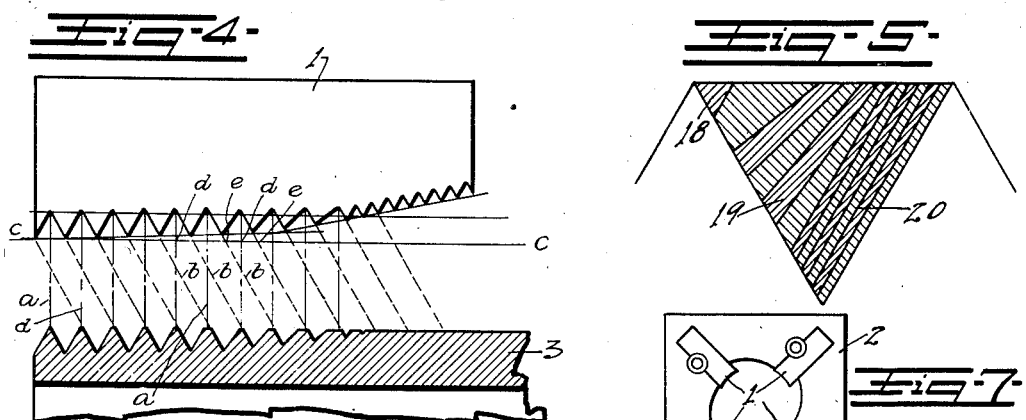
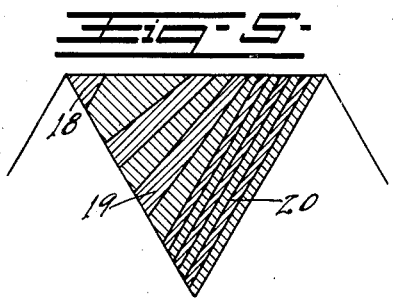
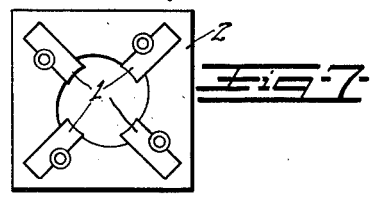
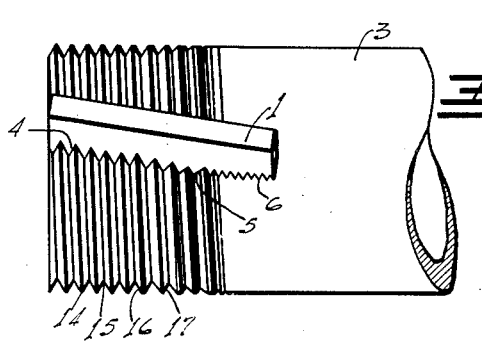
Inventor
John D. Merrifield
Attorney Patented Jan. 17, 1928.

1,656,593

UNITED STATES PATENT OFFICE.

JOHN D. MERRIFIELD, OF ERIE, PENNSYLVANIA, ASSIGNOR TO REED MANUFACTURING COMPANY, OF ERIE, PENNSYLVANIA, A CORPORATION OF PENNSYLVANIA.

SCREW-THREAD-CUTTING TOOL FOR CUTTING TAPERED THREADS.

Application filed February 19, 1923. Serial No. 619,879.

Screw thread cutting tools for cutting tapered threads as now ordinarily designed advance on the thread cutting both slopes of the threads as cut. Ordinarily where tapered threads are cut with a die the finished thread is the thread under the die. In the present invention I provide a cutting tool which is designed to cut tapered threads and to cut the thread from one slope of the thread. This has very material advantages in that it reduces the total line of severance and consequently the energy necessary to make the cut. It forms a continuous or smooth wall on one slope without the steps usually left by the tool at points where the cutters cease their forward movement. This is of material importance in cutting pipe threads. It also forms ribbon-form chips as distinguished from the triangular-shaped chips and these can be readily disposed of where the tail is backed off as a die, the cut being along one wall and the chips of the flat shape. There is no tendency for the chips to jam, or retard the backing off of the die, nor is there any tendency to injure the cut threads in this operation. In carrying out the invention where the cut is from one slope it is necessary to vary the pitch, or inclination of the spiral cut by the successive teeth from that of the finished thread in proportion to the thickness of the cut in one rotation of the die. Where the cut is on the side in advance of the trough of the thread it is necessary to make the lead enough faster than the lead of the finished thread to compensate for the thickness of the cut in one rotation of the tool so that the troughs will all be properly placed under the tool. In carrying out the invention I prefer to provide the die with starting teeth having one slope with an inclination varying from that of the finished thread to facilitate the starting but with a crest forming a properly spaced trough in the finished thread. Other features of the invention and details will appear from the specification and claims.

The invention as exemplified is shown in the form of a die and illustrated as follows:—

Fig. 1 shows an elevation of a chaser in a position starting on a pipe.

Fig. 2 a similar view with the chaser further advanced.

Fig. 3 a view showing the completed cut.

Fig. 4 a diagrammatical view showing the relation of the chaser teeth to the teeth cut on the die.

Fig. 5 an enlarged view showing the successive cuts made in the progress of the die.

Fig. 6 a plan view of one of the chasers in position of the thread.

Fig. 7 shows a so-called solid die in which the chasers may be arranged.

1 marks the chaser, 2 the die body, 3 a pipe or bar being cut. The chasers or die has the finishing teeth 4 with the crests $4^a$ and troughs $4^b$, the starting teeth 5 with the crests $5^a$ and the troughs $5^b$, and the fine entering teeth 6 having the crests $6^a$ and troughs $6^b$. As shown in Fig. 4 dash lines indicate the relation of the crests of the teeth with the troughs of the teeth being cut.

The pipe ordinarily as cut off has a burr 11 and the entering teeth 6 are particularly designed to engage and pass this obstruction. The starting teeth form a small spiral groove 12 in the bar, leaving a flat crest 13. This is the reverse of the ordinary manner of cuttings threads with dies in that ordinarily the entering or starting teeth cut a flat trough and leave hair-like threads on the bar. The difficulty with this method is that these threads have not sufficient substance to sustain the thrust of leading on the die and consequently are stripped. With the present structure with the broad metal between the starting grooves there is sufficient metal to prevent stripping and it is consequently possible to start the die without the ordinary lead screw.

The threads cut on the pipe have the crests 14, troughs 15, the forward slope 16 and rearward slope 17.

The successive cuts are shown in Fig. 5, the entering teeth making a cut of material indicated at 18, the starting teeth making cuts indicated at 19 and the teeth 4 a series of ribbon-like cuts as indicated at 20.

I prefer to set the chasers diagonally in that this gives a greater side rake to the cut and the biting in of the cutting edge tends to correct the lag in the lead which occurs where the chaser is set more nearly in line with the axis.

It will be observed as indicated by lines $a$ that the troughs of the teeth in the die correspond with the peaks of the finished thread and inasmuch as the cutting is done entirely along the front slope of the thread the lead of the teeth in the cutter is as much greater than the lead of the threads being cut as the thickness of the cut in one rotation so that the troughs of the thread cut are properly spaced under the die. The lines $b$ extend from each tooth of the die to a tooth cut at the inclination of the slope; $c$—$c$ a line parallel to the axis and extending from the peak of the tooth of the die having the smallest radius; $d$ the intersections of lines $a$ and $b$ and $e$ intersections of lines $c$ and $b$. The intersections at $c$ of the lines $a$ and the lines $b$ indicate the lead of the thread of the chaser. It will be noted that the distances between the points $e$ vary from the distances between the crest of the thread of the die and this indicates the thickness of the cut. Thus the variation in pitch which the cutting from one slope alone would bring about is rectified so that the troughs of all the finished threads are properly spaced from the deepest cut to the most shallow cut. I prefer to make the entering threads finer but of the same lead as the other threads. Ordinarily there are two threads in the same space as occupied by one thread of the ordinary cutting thread and I prefer to make the starting threads with the cutting face inclined to the finished thread so that it will more readily wedge on to the pipe and thus facilitate the starting of the die on the pipe. This is done while still maintaining the troughs between the threads in proper relation.

What I claim as new is:—

1. A screw thread cutting tool having tapered cutting teeth with crests spaced as the crests of the thread to be cut and with the pitch spiral along the slopes of the teeth whereby the cut of the tool is along one slope of the thread cut.

2. A screw thread cutting tool having tapered cutting teeth with their crests spaced as the crests of the thread to be cut, said teeth having a pitch lead varying from the pitch of the thread to be cut whereby the cut is made on one slope of the thread.

3. A screw thread cutting tool for cutting tapered threads having teeth in tapered relation and spaced as the thread cut and spiraled and shaped to make their cuts on one slope of the thread cut, the teeth at the starting end of the tool having one slope inclined differently than the succeeding threads.

4. A screw thread cutting tool for cutting tapered threads having teeth in tapered relation and spaced as the thread cut and spiraled and shaped to make their cuts on one slope of the thread cut, the teeth at the starting end of the tool having their front slope inclined less abruptly than the succeeding threads.

5. A screw thread cutting die for cutting tapered threads having teeth in tapered relation and spaced as the thread cut and spiraled and shaped to make their cuts on one slope of the thread cut, the teeth at the starting end of the die having one slope inclined differently than the succeeding threads.

6. A screw thread cutting die for cutting tapered threads having teeth in tapered relation and spaced as the thread cut and spiraled and shaped to make their cuts on one slope of the thread cut, the teeth at the starting end of the tool having their front slope inclined less abruptly than the succeeding threads.

7. A screw thread cutting tool for cutting tapered threads having teeth in tapered relation and spaced as the thread cut and spiraled and shaped to make their cuts on one slope of the thread cut, the teeth at the starting end of the tool having one slope inclined differently than the succeeding threads and having the crests of such threads similarly spaced with relation to the crests of the succeeding teeth and spaced similarly to the troughs of the threads cut.

8. A screw thread cutting die for cutting tapered threads having teeth in tapered relation and spaced as the thread cut and spiraled and shaped to make their cuts on one slope of the thread cut, the teeth at the starting end of the die having one slope inclined differently than the succeeding threads and having the crests of such threads similarly spaced with relation to the crests of the succeeding teeth and spaced similarly to the troughs of the threads cut.

9. A screw cutting tool having tapered screw cutting teeth having their crests spaced as the crests of the thread to be cut and having tapered starting teeth finer, closer together and of the same lead as the screw cutting teeth.

10. A screw thread cutting tool for cutting tapered threads having thread cutting teeth in tapered relation and spaced as the thread cut and spiraled and shaped to make their cuts on one slope of the thread; and pointed starting teeth in advance of the thread cutting teeth finer but of the same pitch as the thread cutting teeth, said starting teeth being in the form of plural threads, certain of said threads being in continuation of the spiral of the thread cutting teeth.

11. A screw thread cutting tool for cutting tapered threads having thread cutting teeth in tapered relation and spaced as the thread cut and spiraled and shaped to make their cuts on one slope of the thread cut, intermediate teeth in advance of the thread cutting teeth having one slope inclined differently from the opposite slope, and pointed starting teeth in advance of the intermediate teeth finer but of the same pitch as the thread cutting teeth.

12. A screw thread cutting tool for cutting tapered threads having thread cutting teeth in tapered relation and spaced as the thread cut and spiraled and shaped to make their cuts on one slope of the thread cut, intermediate teeth in advance of the thread cutting teeth having one slope inclined differently from the opposite slope, and pointed starting teeth in advance of the intermediate teeth finer but of the same pitch as the thread cutting teeth, said teeth being in the form of plural teeth and certain of said teeth being in continuation of the spiral of the thread cutting teeth.

In testimony whereof I have hereunto set my hand.

JOHN D. MERRIFIELD.